Patented Jan. 30, 1951

2,539,544

UNITED STATES PATENT OFFICE 2,539,544

SIMULTANEOUS DEFATTING AND DEHYDRATING OF FATTY SUBSTANCES

Ezra Levin, Champaign, and Everett M. Worsham, Monticello, Ill.; said Worsham assignor to said Levin No Drawing. Application January 3, 1950,
Serial No. 136,640

12 Claims. (Cl. 99—208)

This invention relates to a process for simultaneously dehydrating and defatting fatty substances containing substantial amounts of water. More particularly it relates to a method for removing water and fat from animal tissues which are sensitive to heat at temperatures above about 100° C., in order to preserve certain valuable nutritive and therapeutic properties thereof.

Many substances, particularly of animal origin including glandular tissue, muscle tissue, blood, etc., contain relatively high proportions of water which is present either in the form of intracellular fluid or is present in the cell tissue as intercellular fluid. The removal of water from such tissues can be accomplished by evaporation over long periods of time at low temperatures and in dry atmospheres, or by heating to temperatures above 100° C. These operations require long periods of treatment and result in deep-seated changes in the tissue. In some instances drying operations, such as, vacuum pan drying, drum drying, and the like, are accompanied by changes due to autolysis, or bacteriological action and partial putrefaction. When high temperatures are used the solid residues may be badly burned, producing products of low food value in which many biological values have been completely destroyed. At temperatures above 100° C. protein constituents tend to coagulate, binding the water so that drying operations are time consuming, costly and destructive of the tissue. Even the grinding of the tissue to small particle size does not eliminate this factor. Reduction of water to a point below approximately 5 to 10% is difficult.

The presence of fat in dried tissue is generally objectionable. Shelf life is often short because of the development or rancidity. Moreover, the fat may interfere with other operations to be performed upon the dried tissue, for example, in production of extracts, concentrates, etc.

In the pharmaceutical field the production of concentrates from raw tissue is generally a long and involved process. By prior art methods it has not been possible to dry the raw tissues, followed by extracting the fat without also destroying or seriously impairing extractable therapeutic values present. Consequently the raw tissue without dehydration or defatting is conventionally processed to produce extracts. In certain instances the fat is extracted with water-soluble solvents before recovering the desired extract. These operations have generally resulted in relatively low recovery of the values sought.

In our copending application Serial No. 638,446, filed December 29, 1945, now Patent No. 2,503,312, we have disclosed a process by which tissue can be simultaneously defatted and desiccated by an azeotropic distillation in the presence of water-insoluble fat solvents. The operation is carried out by partially coagulating the comminuted cellular material so as to prevent particles thereof from forming a lump or mass which cannot be dehydrated or defatted. The partially coagulated particles do not agglomerate and the solvent-azeotrope former is in intimate contact with them at all times during the distillation. The azeotropic distillation is carried out below 100° C. and the solvent which is also the azeotrope-former simultaneously extracts the fat from the tissue so that at the end of the operation the water has been reduced to the desired extent without harming those therapeutic values capable of existing substantially unimpaired at temperatures from about 60° to 100° C. After the water is removed, all that remains to be done is to drain the solvent-fat solution and to rinse the solids once or twice to remove occluded solvent-fat solution. The solvent absorbed by the solid particles is then evaporated at low temperature. Fat and water removal is rapid so that the tissue is heated for a short time only.

The present invention comprises an improved method for accomplishing the simultaneous azeotropic dehydration and defatting of such tissues.

In a broad embodiment the invention comprises mixing comminuted cellular tissue, which tends to coagulate to form an impervious lump or cluster when heated, with a water-insoluble fat solvent capable of forming an azeotrope with water boiling under atmospheric pressure at a temperature between about 60° and about 90° C., initiating azeotropic distillation at a temperature below the coagulation temperature of the protein in said tissue, and at a subatmospheric pressure, thereby removing a portion of the water from said tissue, thereafter gradually increasing the pressure on the system generally to atmospheric without stopping the distillation, and continuing the azeotropic distillation until the desired amount of water has been removed, at all times maintaining the temperature below approximately 100° C. and at all times maintaining sufficient liquid fat solvent in contact with the tissue to suspend the solids and to dissolve the fat contained in said tissue, thereafter separating the fat-solvent solution from the desiccated solid and finally evaporating the absorbed solvent from the solid thus formed.

The term "tissue" as used herein refers to raw or undehydrated cells or aggregates of cells together with their intra- and inter-cellular substances and containing biological values naturally occurring therein substantially unimpaired.

Tissues which may be treated according to the present process may be glandular, muscular, and the like, and may include liver, thyroid, stomach lining, intestinal mucosa, kidney, kidney cortex, kidney medulla, spleen, blood, brain, heart, ovary, testes, lymph, mammary or pituitary glands or parts thereof, placenta prostate bladder spinal cord, muscle, bone marrow, adrenal, adrenal cortex, adrenal medulla, salivary glands, uterus, pineal, thymus, intestines, fish entrails and glands, fish, pigskins, meat scraps, etc.

The solvents should form azeotropes with water which boil under atmospheric pressure, well below 100° C. and preferably at about 65° to about 85° C. The preferred solvents themselves boil below about 120° C. and preferably well below 100° C. The most effective solvents boil at about 75° to 85° C. They should be capable of forming an azeotrope having a high water to solvent ratio which boils at subatmospheric pressure, below the coagulation temperature of the protein in the material being dried and defatted. They should be water insoluble and preferably heavier than water so that the wet, raw tissue tends to float on them. The composition of the azeotrope should be such that the water to solvent ratio is high in order to minimize the amount of solvent that must be distilled and recovered. Fats should be readily soluble in them. They should be thermally stable at temperatures below 100° C. and should not react with the tissue or decompose readily in the presence of water under operating conditions. They should be of sufficient purity as not to leave residues in the dried tissue or fat which are nonvolatile at temperatures employed for evaporating solvent from either. They should not impart objectionable odor or flavor to the oil or dry tissue.

The preferred solvents comprise halogenated hydrocarbons and particularly the halogenated derivatives of low boiling aliphatic hydrocarbons. The halogenated hydrocarbons may include the chlorine, bromine and in certain instances, fluorine derivatives. These solvents should boil below approximately 120° C. under standard conditions and should be capable of forming an azeotrope with water boiling substantially below 100° C. and above about 60° C. at atmospheric pressure. These as well as other solvents useful in the process are those which form an azeotrope containing relatively large amounts of water at temperatures below 60° C. in order that the water content of the tissue may be reduced in the early stages of the process without distillation and recovery of excessive amounts of solvent. The preferred solvents are ethylene dichloride, propylene dichloride, trichlorethylene, perchlorethylene, and the like. Corresponding bromine and fluorine compounds having properties such as described may be used. These solvents not only have the required boiling characteristics and azeotropic forming properties but are excellent selective solvents for the lipoid substances contained in the tissues including fatty acid glycerides, sterols, phosphatides, oil-soluble vitamins and other fatty or oily substances. They do not dissolve water-soluble vitamins or other water-soluble therapeutic values contained in the tissue, nor do they dissolve the protein. Moreover they inhibit autolytic activity. The fresh glands can be stored under such solvents at room temperature for long periods of time without autolysis. Moreover, the solvents are readily recoverable from the fat and from the dry, defatted residue without leaving toxic by-products or materials of objectionable flavor or odor. Their low solubility in water is advantageous because it simplifies solvent recovery.

Other types of solvents which are useful but not necessarily exactly equivalent to the halogenated hydrocarbons include low boiling aliphatic and aromatic hydrocarbons and low boiling fractions of petroleum which form azeotropes boiling within the operating range. These include benzene, hexane, pentane, toluene, cyclopentane, cyclohexane, amylene, hexene, cyclohexene, and others.

The first step in the process is to comminute the fresh tissue. This may be done in a grinder or hammermill to produce particles of small size. This operation generally is accompanied by some separation of an aqueous phase if it is carried out on unfrozen tissue. The preferred method of comminution is to freeze the tissue and, while it is in frozen condition, to grind it, for example, in a hammermill. The dehydrating-defatting operation of this invention cannot be successfully carried out on large chunks of the tissue. Particles as large as three-eighths or one-half inch in diameter cannot, as a practical matter, be completely dehydrated and defatted, consequently the particles should be considerably smaller. The tissue should be fresh and is either processed immediately after the animal is killed, or the tissues are immediately frozen after the animal is killed by well-known deep freeze methods and are maintained in this form until ready for processing. Many of the glands and other organs useful in this process are customarily deep frozen shortly after the animal is killed, consequently they are received in frozen condition.

Immediately after grinding the tissue is introduced into a suitable vessel and suspended in solvent. The vessel may comprise a still equipped with a vapor line, condenser and receiver which may also be a separator for separating water and solvent. It should have means for introducing the solvent and tissue and for draining the solvent from the tissue when the dehydration and defatting operation is completed. Means should also be provided for removing the solid dehydrated and defatted tissue from the vessel. The system should be equipped with a vacuum pump for reducing the pressure to and including the receiver.

After the tissue and solvent have been introduced, the vessel is evacuated and the contents heated to initiate azeotropic distillation at a temperature of about 30° to about 55° to 60° C., but in any event below the temperature at which the protein in the tissue will be coagulated by heat. The distillation is continued until a substantial amount of water has been removed. This may range from about 10 to 30% or more of the total water present. This will depend upon the proportion of water to fat and solids in the tissue, and to its tendency to form coagulated masses of agglomerated particles. At this point the solvent should be boiling violently. The pressure is then gradually restored to atmospheric, while more heat is applied, generally through closed heating coils, to maintain the solvent in its boiling condition. Those solvents on which the raw particles tend to float are especially useful, since the vapors pass up through the suspended particles, keeping them in motion. When the pressure reaches atmospheric, the distillation is continued at the normal atmospheric boiling point of the azeotrope until the desired amount of water has been removed. The water is substantially completely removed when there is a substantial and relatively sharp upturn in the temperature of the vapors and of the solvent within the still. At this point the distillation is discontinued. As a general rule the temperature should not be allowed to increase more than a few degrees above the boiling point of the azeotrope, and in any event should be kept below 100° C. Many heat labile components are damaged to a lesser extent when in dry form than in the presence of water. Hence the temperature at the end of the operation is within limits less critical than in the early stages. During the entire distillation the amount of the liquid solvent in the still should be maintained sufficient to keep the tissue particles in suspension and in excess of the amount required to dissolve the fat. The temperature should never exceed 100° C. and preferably is maintained below 90° C.

The time at which the tissue is at processing temperatures should be kept as short as possible. This is especially true of the nonfatty portion. The distillation can generally be carried out in from 0.5 to 3 hours and preferably not more than 2 hours. Many values of the tissue are partially or completely destroyed if held long enough at elevated temperature, and this tendency increases as the temperature approaches 100° C. Therefore, the solvent should be chosen and the equipment designed and the operation carried out with this in mind. The quality and uniformity of the products depend to some extent upon these factors.

The pressures used in initiating the azeotropic distillation are generally less than 500 mm. of mercury. The preferred range is of about 50 to 300 mm. of mercury. It should be sufficiently low considering the solvent used so that the boiling point of the water azeotrope is below the coagulation point of the protein in the tissue and preferably is below about 50° C. Otherwise the protein will coagulate, the particles are likely to agglomerate forming large masses or clusters which cannot be completely dehydrated and defatted. An outer skin of coagulated material forms and the inner part of the mass is wet and soggy and contains its original fat. The coagulation temperature varies slightly with different tissues but is generally about 60° C.

As described in our copending application agglomeration can be prevented by stirring, however, when large vessels, perhaps containing several tons of tissue, are employed, stirring may be difficult and not entirely uniform. Consequently in spite of all precautions there may be some agglomeration. By the present method the need for mechanical stirring is eliminated, although it can be used if desirable, especially during the time the contents of the vessel are being heated to the initial azeotroping temperature. Such stirring increases the heat transfer efficiency and may save time in the operation.

Without being bound by theory, we explain this beneficial effect obtained by one process in two ways. First, that the outer surfaces of the individual suspended particles are partially dehydrated by the initial azeotropic distillation at the low temperature so that the tendency for adjacent particles to stick together is minimized or eliminated; and, secondly, the boiling action or ebullition of the solvent tends to keep the particles in motion so that they do not agglomerate even when the temperature eventually reaches that at which protein normally coagulates due to the action of heat. The latter effect is particularly pronounced when the solvent is heavier than water.

It should be kept in mind that the dehydration in the initial step is incomplete and may be insignificant compared with the total water content. Enough water remains in the protein so that it would coagulate by the action of the heat and might form clusters or agglomerates if it were permitted to remain entirely quiescent. It is important, therefore, that the solvent be kept boiling and the azeotropic distillation should not cease during the time the pressure is being raised to atmospheric. It should also be pointed out that merely introducing the coaguable tissue into a still and gradually heating at atmospheric pressure until azeotropic distillation begins does not serve the same purpose as when the azeotropic distillation is initiated below the coagulation point. At atmospheric pressure the solvents useful in this invention boil above the coagulation point of the tissue. Hence if the procedure just referred to is used, the tissue particles agglomerate before azeotropic distillation begins, and the subsequent boiling will not break them up. As a consequence the mass can neither be dehydrated nor defatted. This is a highly important requisite of the present process which differs from certain prior art processes such as described in the Ash Patent No. 1,934,677 or the Grotkass Patent No. 1,005,539. In the Ash process, which is a two stage method, the tissue is placed in a basket and vapors are passed over it to effect dehydration, followed by refluxing to defat. When the Ash operations are carried out using fresh comminuted glandular or muscular tissue, an impervious mass forms which cannot be dehydrated or defatted. The Grotkass patent also uses vapors or solvent but uses whole carcasses and these cannot be dehydrated and defatted for similar reasons. Applicant, on the other hand, suspends comminuted material in liquid solvent and maintains the particles in such condition that the full benefit of simultaneous azeotropic drying and fat extraction are obtained. Our process is directed to solving desiccation and defatting problems with coaguable tissues containing more than about 50% and often as high as 70 to 90% water.

In order to maintain the requisite amount of solvent, one of two procedures may be employed. Either sufficient liquid solvent is added initially to carry out the entire operation and so that enough solvent remains when the operation is complete to keep the solids in suspension and the fat dissolved; or by replacing solvent removed during distillation, preferably by recycling it. The latter is preferred. This is carried out by condensing the azeotrope vapors, separating the water layer, and pumping the solvent back to the still.

During the atmospheric pressure portion of the operation the temperature is normally above 60° C. and below 100° C. When using ethylene dichloride, the azeotrope boils at about 71° C. at atmospheric pressure. During this step the solvent is continuously and actively withdrawing or extracting the oils and fat from the tissue undergoing treatment. The oil remains dissolved in the liquid solvent contained in the still since an excess of liquid solvent is employed over that necessary to completely dissolve it. Substantially all of the fat is dissolved by being withdrawn through the cell walls into the solvent. It is an unexpected result that the water contained within the cells should be removable by the azeotropic distillation particularly at the rapid rate that this has been found to occur. It might be expected that intracellular water would be removed, but it should be borne in mind that the grinding or comminuting of the tissue does not destroy all of the cell structure and a great majority of cells are present unbroken. Microscopic examination of the desiccated tissue shows all structure to be largely intact. Since the solvent is water-insoluble it might be expected that the only water in the system that would be removed by azeotropic distillation would be that freed by rupturing of some of the cells during grinding. This, however, is not the case. In some fashion the intercellular water seems to move out of the cellular tissue and form an azeotrope which is removed by distillation. The dual and simultaneous effect of extracting the fat and removing the water seems to result in a mutual benefit for both actions so that fat removal and water removal are rendered more rapid and effective. In fact we know of no method by which water and fat can be removed in successive steps without harm to the tissue.

During the operation the fat appears to be completely "dissociated" from the tissue so that when the operation is complete the solution can be drained from the dry solids remaining. It is then necessary only to rinse the solids to remove such fat-solvent solution as may be occluded thereto. This second step is not an extraction step but merely a rinsing step. These final washings from the meal can be used in the initial treating of the next batch of material. This results in solvent savings and reduced operating costs for solvent recovery.

After draining as much solvent as can be removed in this way, the residual solvent absorbed by the dry meal is removed by evaporation. This may be done by evacuating the system with or without passing a sweep gas therethrough. The temperature of the meal should be kept below about 100° C. during this time.

The resulting meal is stable when stored in the usual manner in closed containers and can be maintained for many months without deterioration. The meal is generally far less hygroscopic than extracts and the like produced by the usual methods of commerce. It does not contain toxic substances, and the odor and taste are mild. The meal can be used as such for many purposes either as a food supplement or as a source of many hormones and therapeutic factors, such as, anti-pernicious anemia factor, the "animal protein factor" described by Bosshardt et al., J. Nutrit. 37, 21 (1949), etc. Liver powder produced by this process was found to contain as much of the "animal protein factor" as a commercial liver concentrate which represented the product from four times the amount of raw liver as was used in the present process.

When raw, fresh thyroid glands were treated by the present process, using ethylene dichloride, and using a maximum temperature of 75° C., it was found that an amount of thyroxine peptide could be isolated which was equivalent to that contained in fresh thyroid. The odor of the dry powder was mild and none of the objectionable odor characteristic of commercial extracts was present.

An example of one operation of this process is as follows:

100 pounds of finely ground fresh, raw hog liver was placed in a still with 100 gallons of ethylene dichloride. The system was evacuated to a vacuum of 21 inches, the vacuum pump being attached to the distillate receiver. Azeotroping was started under this pressure at a temperature of 40° C. When azeotroping was well in progress the valve to the vacuum line was closed and the temperature was gradually increased to 71° C. during which period of time the vacuum gradually reduced itself to 0 inches. This required about 45 minutes. Azeotroping was continued at atmospheric pressure for an additional 45 minutes. The temperature remained at 71° C. until shortly before the end of this period when it rose rather rapidly to 83° C. At this point substantially all the water had been removed from the liver. The solvent-fat solution was separated from the solids by filtering through a cloth. The solids were rinsed with fresh solvent to remove occluded fat and again filtered. The absorbed solvent was evaporated at a temperature below 100° C., using vacuum. The solvent was recovered from the fat by distillation. 20 pounds of dehydrated solids and 2.5 pounds of fat were recovered.

During the time the pressure was being increased from 21 to 0 inch the solvent in the still was kept boiling violently. It was found that the particles of the liver did not agglomerate when the temperature at which raw liver normally coagulates (about 60° C.) was reached and passed.

The extracted liver fat contained about 10,000 units of vitamin A per gram. The fat was stored in a closed drum at room temperature for one and a half years and at the end of this time was found to contain 9,600 units of vitamin A per gram.

Similar treatment of lung, thyroid, horse heart, and fish muscle are illustrated by the results shown in the following table. Conditions essentially those described in the foregoing example were used.

| Tissue | Pounds Raw | Pounds Solids | Pounds Fat |
|---|---|---|---|
| Lung | 100 | 14 | 1.5 |
| Thyroid | 100 | 18 | 5 |
| Horse Heart | 175 | 28 | 10 |
| Fish Muscle | 100 | 19 | 0.75 |

The oil recovered from these substances contained vitamins and oil-soluble hormones unimpaired as far as could be ascertained by conventional assay methods. The meal contained water-soluble hormones, vitamins and other substances of similar character. Similar improved results are obtained when using trichlorethylene, perchlorethylene, propylene dichloride, isopropyl acetate, isopropyl ether, toluene, benzene and heptane. The boiling point of the azeotropes differs, of course.

One advantage of the process over those in which tissue is pressed to remove oil and water is that the water-soluble values are retained in the meal. With pressing operations such values are impaired or lost. It was also noted that the liver and other meals produced by this process do not have the objectionable flavor and odor of those produced by conventional processes and contain thiamin to about the extent that it is originally present in the raw tissue.

When this process was applied to fish liver, for example, not only did the fish liver oil contain its high concentration of vitamins A and D unimpaired, but a dried, defatted high protein fish liver powder containing water-soluble vitamins, hormones and other factors of high therapeutic and food value were recovered. This meal is fit for human consumption, as is the oil, without further refining. By conventional methods for producing fish liver oil the protein portion is largely destroyed and rendered unfit for human consumption. Conventional methods include autolyzing fish liver until the oil is freed from the cells and separates as a layer which is then skimmed and refined. The rotted protein portion of the tissue is generally discarded or used as fertilizer or in animal foods.

According to another variation of the process the tissue may be subjected to partial controlled autolysis and otherwise activated to increase its activity with respect to certain values. Thus, for example, thyroid may be partially autolyzed under controlled conditions at a temperature above 0° C. and preferably below about 25° C. to increase the thyroxine content. This has been found desirable in view of the fact that part of the thyroxine in the thyroid is in a latent form which can be converted to the active form by controlled autolysis. The autolyzed substance may then be subjected to the process above described, using ethylene dichloride or one of the other solvents, to produce dry, defatted thyroid powder having a thyroxine content as great as that of the original tissue.

We claim:

1. The process for simultaneously desiccating and defatting animal tissue, comminuted particles of which tend to coagulate and conglomerate upon heating to temperatures above about 60° C., which comprises the steps of suspending the tissue in a water-insoluble fat solvent at a temperature below the coagulation temperature of the protein in said tissue, reducing the pressure below atmospheric, initiating boiling and azeotropic distillation of the solvent and water at a temperature below the coagulation point of said protein, gradually increasing the temperature and raising the pressure to atmospheric while at all times maintaining the solvent in boiling condition, continuing the distillation at atmospheric pressure and at a temperature below 100° C. to remove a major portion of the water present and simultaneously defat said tissue, then separating the solvent-fat solution from the desiccated and defatted solids, and evaporating absorbed solvent from the solids.

2. The process of claim 1 wherein the solvent is a low boiling halogenated hydrocarbon.

3. The process of claim 1 wherein the solvent is ethylene dichloride.

4. The process of claim 1 wherein the tissue is comminuted animal tissue.

5. The process of claim 1 wherein the tissue is liver.

6. The process of claim 1 wherein the tissue is fish.

7. The process of claim 1 wherein the tissue is muscular.

8. The process of claim 1 wherein the tissue is glandular.

9. The process of claim 1 wherein the tissue is kidney.

10. The process of claim 1 wherein the tissue is thyroid.

11. The process of claim 1 wherein the tissue is an activated glandular tissue.

12. The process of claim 1 wherein the tissue is thyroid activated to increase the thyroxine content.

EZRA LEVIN.
EVERETT M. WORSHAM.

No references cited.